United States Patent

Martin-Gerez

[11] Patent Number: 6,068,351
[45] Date of Patent: May 30, 2000

[54] HYDRAULIC BRAKING AXLE

[76] Inventor: Jose Luis Martin-Gerez, 20 Avenida Cuahutemoc, La Presa, Tijuana, Baja California, Mexico

[21] Appl. No.: 09/366,091

[22] Filed: Aug. 3, 1999

[30] Foreign Application Priority Data

Aug. 3, 1998 [MX] Mexico ..................................... 986527

[51] Int. Cl.⁷ ....................................................... F16F 9/42
[52] U.S. Cl. ........................ 303/10; 188/274; 188/264 P; 188/264 F; 188/294; 188/295; 188/302
[58] Field of Search ................. 188/274, 264 F, 188/296, 264 P, 264 R, 71.6, 290–295, 264 E, 271, 302–305, 170; 192/70.12, 113.3; 303/10, 2–3; 60/333, 337, 347; 301/6.3, 6.4

[56] References Cited

U.S. PATENT DOCUMENTS

| 2,879,867 | 3/1959 | Rike . | |
| 3,122,220 | 2/1964 | Hoffstrom . | |
| 3,983,966 | 10/1976 | Bryant | 188/295 |
| 4,014,410 | 3/1977 | Bryant | 188/264 P |
| 4,083,469 | 4/1978 | Schexnayder | 188/264 P |
| 4,101,012 | 7/1978 | Durand | 188/264 P |
| 4,114,734 | 9/1978 | Bultmann | 188/264 E |
| 4,451,094 | 5/1984 | Martin | 303/10 |
| 5,178,238 | 1/1993 | Schaeff | 188/295 |
| 5,779,008 | 7/1998 | Vogelsang et al. | 188/296 |

*Primary Examiner*—Douglas C. Butler
*Attorney, Agent, or Firm*—Henri J.A. Charmasson; John D. Buchaca

[57] ABSTRACT

In a braking axle driven by a wheel of a trailer vehicle, wherein an axle-driven pumping mechnism is used to pressurize a volume of hydraulic fluid in response to a braking command, the fluid pressure activates a turbine which in turn drives a cooling fan aimed at a radiator used to dissipate the heat accumulating into the hydraulic fluid. The coaxially circular arrangement of the pumps, control valves and other components of the system yields a simple, efficient and sturdy mechanical structure that can withstand very high internal fluid pressure with a limited and controllable leakage rate.

7 Claims, 4 Drawing Sheets

HYDRAULIC BRAKING AXLE

FIELD OF THE INVENTION

The present invention relates to braking systems, and more specifically to heavy duty braking mechanisms for large trailer trucks.

BACKGROUND OF THE INVENTION

In my earlier U.S. Pat. No. 4,451,094, which is included in this specification by this reference, I have disclosed a highly efficient hydraulic brake system in which the kinetic energy of the vehicle is adjustably used to pressurize an hydraulic fluid. The caloric energy which accumulates into the fluid upon its pressurization is dissipated through a cooling radiator as the fluid is allowed to escape its pressurized chamber. The present invention results from efforts to improve the aforesaid brake system by accelerating the dissipation of the fluid heat and enhancing the sturdiness of the mechanical system whereby higher fluid pressures can be accommodated while leakage can be minimized and controlled.

SUMMARY OF THE INVENTION

The principal and secondary objects of this invention are to provide a very efficient system to quickly dissipate the heat accumulating in hydraulic fluid pressurized under the action of braking pump driven by a vehicle wheel and to greatly increase the braking force by withstanding very high fluid pressure with limited and controllable leakage rates.

These and other valuable objects are achieved by using the fluid pressure to drive a turbine coupled to a fan that is aimed at the fluid cooling generator. As a result, the kinetic energy of the vehicle is partially used and dissipated by the turbine, but mainly converted into heat which is then dissipated by means of a cooler driven by said turbine. The sturdiness of the entire mechanism is enhanced by a coaxially circular constructions of the pumps, control valves and other components. The leakage through the pumps is monitored and automatically compensated for long, trouble-free operation.

DESCRIPTION OF THE PREFERRED EMBODIMENT OF THE INVENTION

Figure 1:
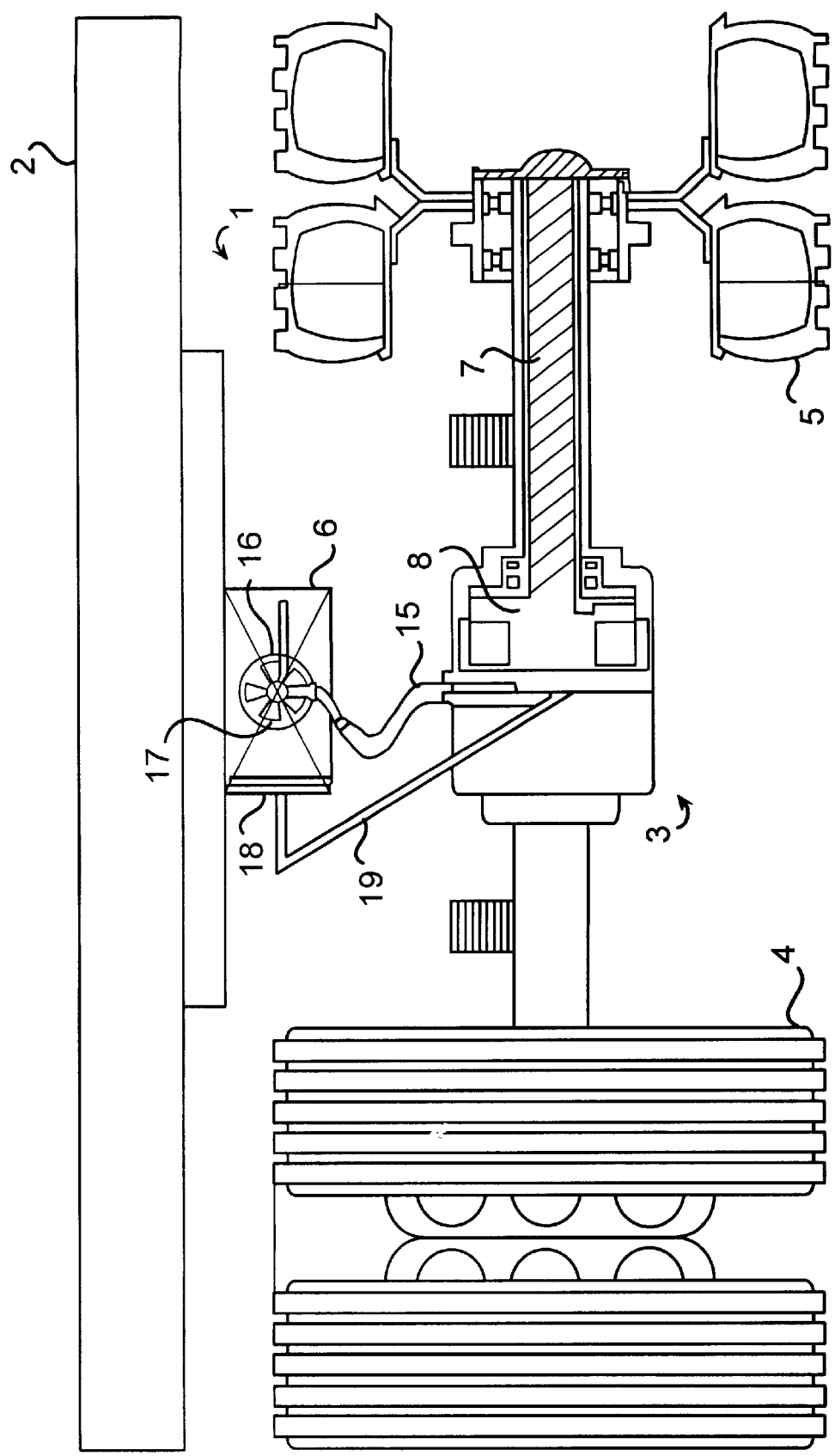
FIG. 1 is a general view of the braking axle mechanism according to the invention.
Figure 2:
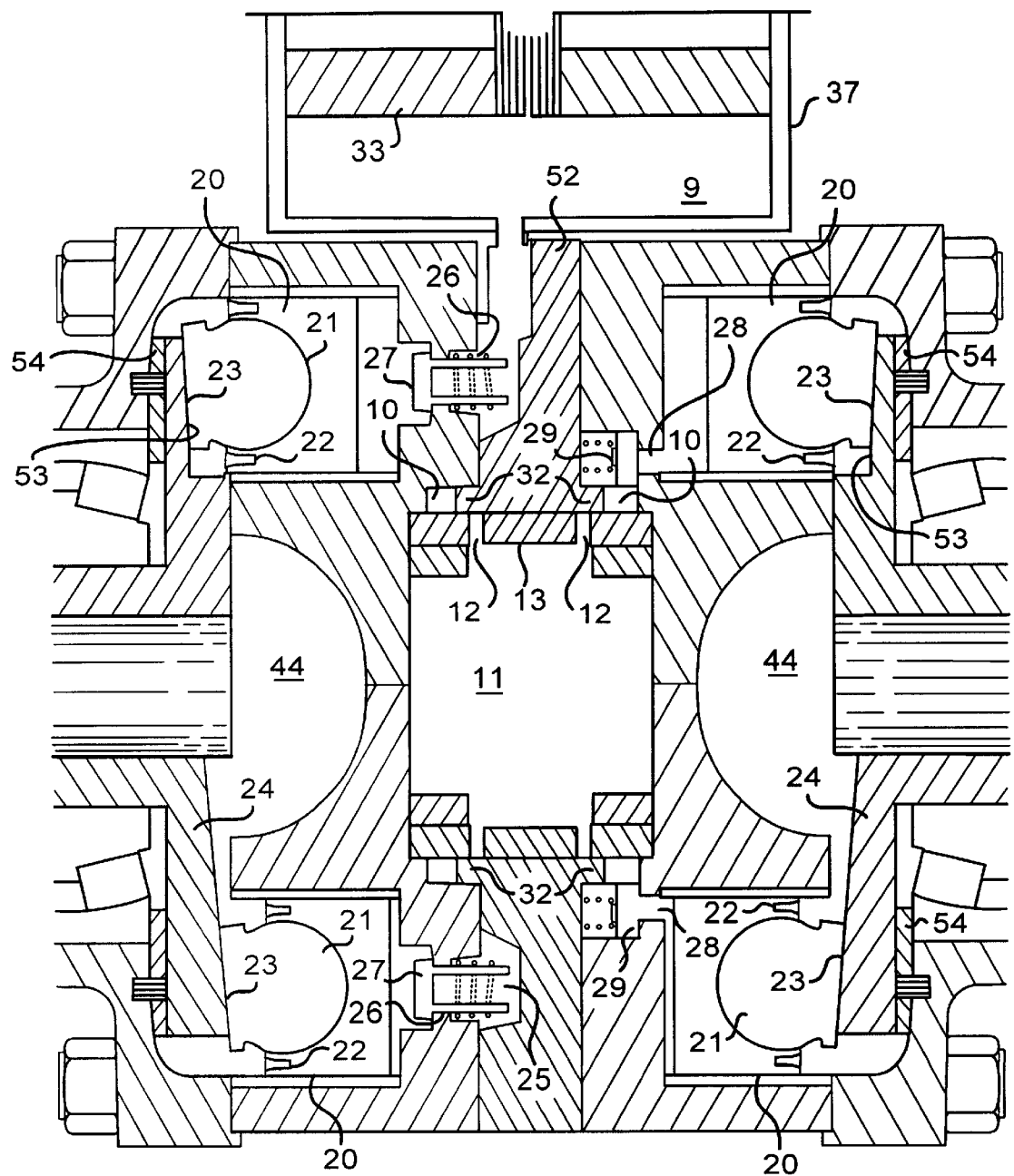
FIG. 2 is an axial cross-sectional view of the pump mechanism.
Figure 3:
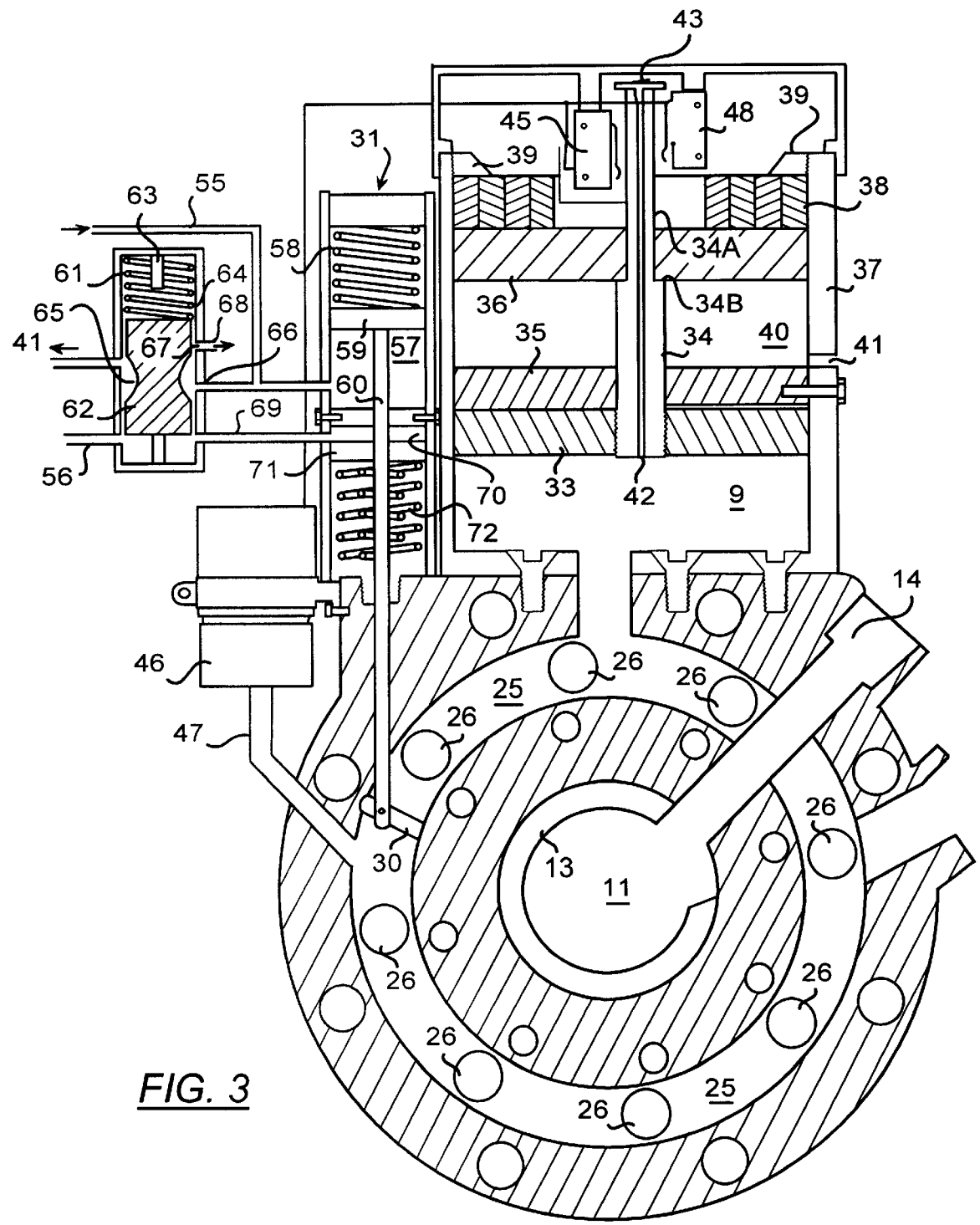
FIG. 3 is a transaxial cross-sectional view of the hydraulic system.

Referring now to the drawing, there is shown in FIG. 1, a wheel and axle assembly 1 installed under the bed 2 of a truck trailer. In this embodiment, a dual braking axle system 3 acting on both sets of wheels 4, 5 is provided. The two halves of the system are identical and share a common cooling unit 6. Accordingly, only one half of the system will be discussed. The axle 7 is driven at one end by one of the sets of wheels 5. At the opposite end, the axle is connected to the braking assembly 3 which includes a pumping mechanism 8 driven by the axle 7. As shown in FIGS. 2 and 3, the pumping mechanism draws an hydraulic fluid such as oil from a compressible reservoir 9 and feeds it to an annular high pressure chamber 10 which surrounds a central circular low pressure evacuation chamber 11. The aperture 12 between the high pressure and low pressure chambers is controlled by a ring valve or choke 13 which moves across the aperture in response to a braking command. The depressurized but heated oil in the low pressure chamber 11 is sent to a radial channel 14 and, via flexible pipe 15, to a turbine 16. The turbine is activated by the flow of the oil and drives a fan 17 which is aimed at the coil of a radiator 18. The oil exiting from the turbine is run through the radiator 18 then returns to the compressible reservoir 9 via conduct 19.

It should be noted that the high pressure chamber 10 and the low pressure chamber 11 are common to both halves of the dual braking system, and that only one turbine 16 and one radiator 18 are used in the system.

As more specifically shown in FIGS. 2 and 3, the pumping mechanism comprises eight pumps 20 are arranged in a circular pattern coaxially with the axle 7. In each pump the piston 21 has a substantially spherical outline which allows it to rock within its mounting ring 22. A flattened surface head 23 in the outer zone of each piston is contacted by a woble plate 24 anchored to the shaft 7 in the same type of arrangement that was disclosed in my previous patent. Oil is brought from the compressible reservoir 9 through annular channel 25 to the inlet ports 26 of the pumps. Check valves 27 in each input port prevent exit of oil therethrough. The output port 28 of each pump is controlled by a check valve 29 of opposite direction and leads to the annular high pressure chamber 10.

Figure 4:
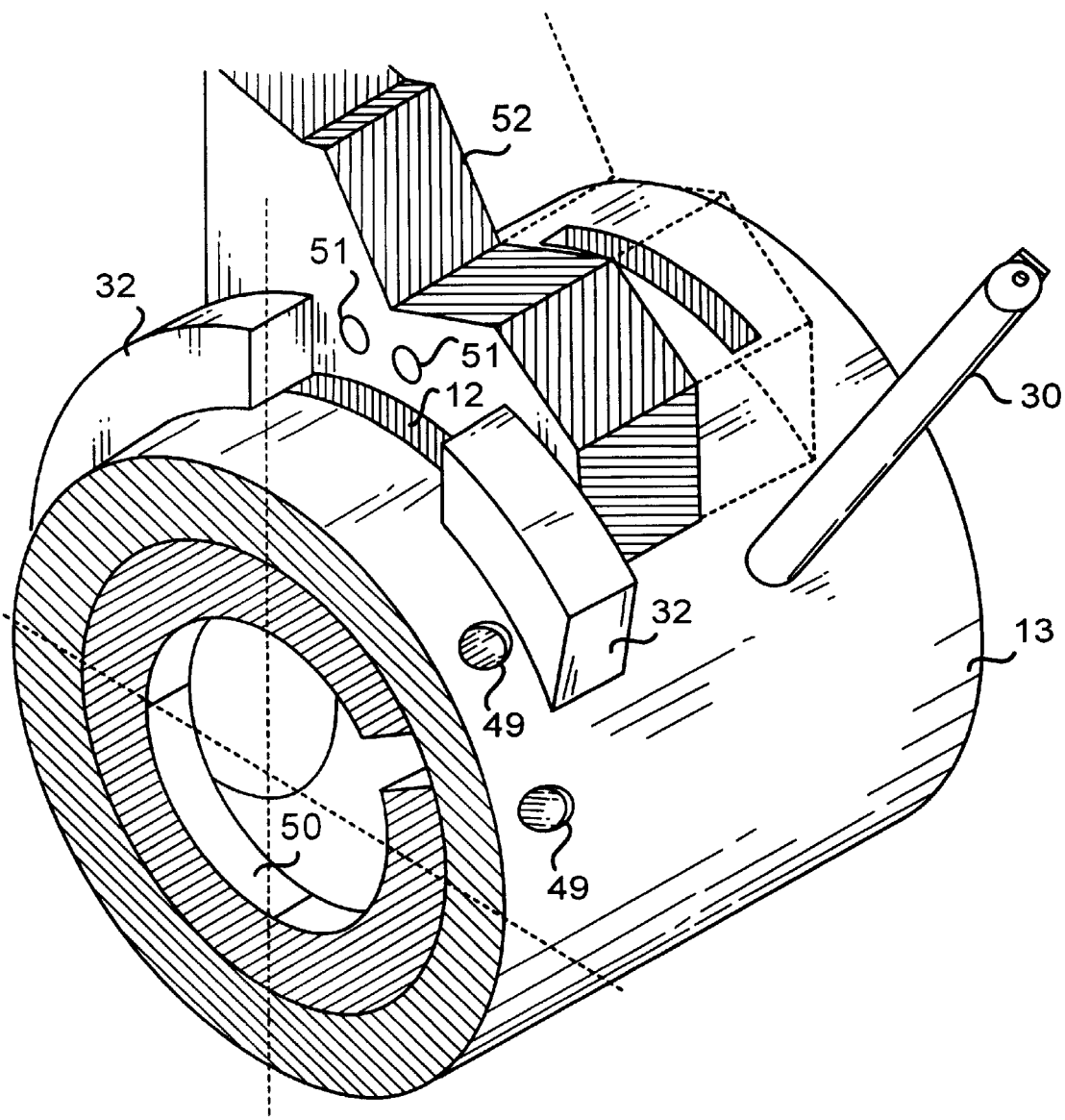
FIG. 4 is a perspective view of the escape valve assembly.

As more specifically illustrated in FIGS. 3 and 4, the annular choke 13 which controls the aperture 12 between the high pressure chamber surrounding the choke and the low pressure chamber 7 surrounded by the choke is rotated by means of an axial lever 30 actuated by a cylinder and piston assembly 31. The apertures 12 is constituted by an arcuate slot cut into the annular choke 13. Depending upon the position of the lever 30, the slot is more or less obstructed by the supporting ring 32 associated with the mechanism housing. Accordingly, the restriction of the slot 12 resulting from a shift of the lever 30 causes an increase of pressure in the high pressure chamber 12 against which the pumps 20 must work. Fluid in the compressible reservoir 9 supports a monitoring piston 33 mounted on a rod 34 passing through a hole in the bulkhead 35, and slidingly mounting along its reduced diameter upper section 34A, a piston 36 within a same pneumatic cylinder 37 The piston 36 is biased toward the bulkhead 35 by a conical coil spring 38 mounted against the head 39 of the cylinder 37 and shown in the completely compress position in the drawing. The position of the piston 36 is controlled by the coil spring 38 in the absence of a volume of pressurized air admitted into the air chamber 40 between the piston 36 and the bulkhead 35 through port 41. A channel 42 bored axially through the center of the rod 34 and closed at the top by a plug 43 is used to purge the hydraulic fluid. Any leakage of oil from the high pressure chamber 12 into the woble plate housing 44 that may occur around the pistons of the pumps 20 will be reflected by the position of the float 33 in the compressible reservoir 9. A limit switch 45 associated with the outer end of the rod 34 detects the maximum acceptable leakage level and actuates a pump 46 which draws hydraulic fluid from a supply tank, and feeds it to the annular channel 25 feeding the intake ports of the pumps via conduit 47. A second limit switch 48 detects the return of the hydraulic fluid to an acceptable level and shuts off the pump 46. The operation of the pump 46 can be evidenced on the control panel of the vehicle by the light or sound indicator. The fact that this indicator remains on for a long period of time signals a defective leak of hydraulic fluid in the system. A series of safety outlets 49 are bored through the rotary choke 13, that is between the high pressure and low pressure chambers. Those outlets are covered by an circular spring 50 within the low pressure chamber 11. The tension of the spring is such that the safety outlets 49 will be opened when the pressure inside the high pressure chamber reaches or exceeds a selected limit. It should be noted that the two pressure chambers associated with each half of the braking device communicate through the bores 51 in the septum 52. This communication between the two high pressure chambers equalizes the braking forces applied to the two sets of wheels. The woble plate 24 is a disk having an internal face 53 that lies in a oblique plane in relation to the axle 7. The sliding contact between that oblique face and the heads of the pumps 20 impart a reciprocal movement to the pistons 21. The woble plate is lined on the opposite side of the piston-contacting surface with a bronze ring 54 which bears against a shoulder formed in the mechanism housing The woble plate chamber 44 is preferably filled with a lubricating liquid.

The braking mechanism is controlled via two air pressure lines connectable to the tractor truck. First, a constant pressure line 55 carries pressurized air when the connection between the trailer and the tractor is made. The second variable pressure line 56 is regulated by the braking pedal mechanism. In the absence of connection between the tractor and trailer, there is no pressure in the upper chamber 40 of the hydraulic fluid pressuring cylinder 37, or in the upper chamber 57 of the choke-activating cylinder 31. The hydraulic fluid is forced out of the compressible reservoir 9 by the monitoring piston 33 due to the load applied to the shoulder 34b of the rod 34 by the piston 37 under the push of the coil spring 38. The pressure of the fluid is imposed upon the inner faces of the pump piston 21 through annular channel 25 and inlet ports 27. In the meantime, the gate 13 controlling the aperture between the upper and lower pressure chambers is closed under the pressure of the spring 58 acting upon the upper piston 59 and the rod 60 connected to the control lever 30. Accordingly, the pistons are pushed firmly against the woble plate 24 immobilizing the vehicle. When the constant pressure line 55 receives an amount of pressured air upon connection between the trailer and the truck, the admission of the pressurized air in the two chambers 40 and 57 counteract the effect of the pushing springs 38 and 58, releasing the brake.

As the brake pedal is actuated and an amount of pressurized air is received into the pilot cylinder 61 through line 56, the piston 62 moves upward up to its maximum travel limited by a stopping nib 63 mounted coaxially within the return spring 64 of the piston. As the annular concavity section 65 in the center part of the piston 62 spans the two lateral ports 66 and 67, any pressurized air in the upper chamber 57 of the choke control cylinder 31 is bled through the escape line 68. The pressurized air from the brake line 56 is fed through line 69 to the lower chamber 70 of the gate control cylinder 31 pushing the piston 71 and the rod 60 downward against a return spring 72 to activate the restricting choke 13. The degree of displacement of the choke and the amount of restriction imposed upon the flow of hydraulic fluid between the high pressure chamber 10 and the low pressure chamber 11 will be proportional to the air pressure in the brake line 56.

The circular and concentric arrangement of all the high pressure components of the system yield a very efficient and highly precise engagement of the various parts for a long-trouble-free and low maintenance operation. The safety valves and the default-locking mechanism practically eliminate any hazardous operation. The ability of the system to efficiently cool the hydraulic fluid during braking operation greatly extends the amount of time this braking operation can be sustained by comparison to traditional drum and disk-based braking systems. Contrary to disk and cylinder where the friction points are dry and subject to high temperature abrasion and distortion, the friction points between the woble plate 24 and the heads 23 of the pump cylinders take place in a lubricating fluid environment. The lubricating fluid can be cooled through an outside radiator or other conventional means.

The eight pump pistons have a diameter of approximately 7.6 centimeters (3 inches) and a stroke of about 1.27 centimeters (0.5 inch). Together, they can develop a pressure of at least 1,054 kilograms per square centimeter (15,000 pounds per square inch). Up to 916 horse power of braking force can be applied to each set of wheels in a perfectly equalized manner that preclude Jackknifing.

While the preferred embodiments of the invention have been described, modifications can be made and other embodiments may be devised without departing from the spirit of the invention and the scope of the appended claims.

What is claimed is:

1. A braking axle for use on at least one wheel of a vehicle trailer, which comprises:

at least one pump driven by said wheel;

a volume of hydraulic fluid pressurized by said pump;

means, responsive to a braking command, for controlling the degree of said fluid pressurization;

means for cooling said pressurized fluid;

said means for cooling comprising:

first means for transforming said fluid pressure into a torquing force;

means for dissipating heat accumulated into said fluid;

means responsive to said torquing force for boosting said means for dissipating heat;

wherein said means for transforming comprise a turbine driven by said pressurized fluid;

said means for dissipating heat comprise a radiator;

said means for boosting comprise a blower driven by said turbine and aimed toward said radiator; and said braking axle further comprises:

an axle connected at one end to said wheel;

a plurality of said pumps arranged in a circular pattern, coaxially with said axle;

means, coupled to an opposite end of said axle, for actuating said pumps;

an annular high-pressure chamber coaxial with said axle, said high pressure chamber being fed by said pumps;

a circular evacuation chamber surrounded by said high pressure chamber, said circular evacuation chamber having at least one aperture into said evacuation chamber; and a rotary choke mounted within said evacuation chamber for restricting flow of fluid through said aperture.

2. The structure of claim 1, wherein said means for actuating said pumps comprise:

each of said pumps including a cylinder and a piston journaled within said cylinder;

said piston having a outer portion defining a first contact surface;

a disk coaxially secured to the opposite end of said axle, and having an inner face in sliding contact with said first contact surface, wherein said inner face define a second contact surface lying in an oblique plane in relation to said axle.

3. The structure of claim 2, which further comprises means for forcefully pushing said first contact surface against said second contact surface in the absence of any control connection to said braking axle.

4. The structure of claim 2, wherein said piston comprises an annular ring and a substantially spherical head connected to said outer portion, and rotatively held within said ring.

5. The structure of claim 3, which further comprise a compressible reservoir holding a volume of said hydraulic fluid;

a pneumatic cylinder having a first piston in contact with said hydraulic fluid;

resilient means for biasing said first piston toward said fluid;

a second piston in said pneumatic cylinder coupled to said first piston; and means for moving said first and second piston against said resilient means and away from said fluid.

6. The structure of claim 5, wherein said means for moving comprises a pneumatic chamber constricted by said second piston and means for admitting a pressurized volume of fluid into said second chamber;

whereby, in the absence of said volume of fluid, high pressure is exerted by said means for biasing upon said hydraulic fluid and transmitted to said pump, forcing said first contact surface against said second contact surface and preventing rotation of said disk and axle.

7. A braking axle for use on at least one wheel of a vehicle trailer, which comprises:

a plurality of pumps driven by said wheel;

a volume of hydraulic fluid pressurized by said pumps;

means, responsive to a braking command, for controlling the degree of said fluid pressurization;

means for cooling said pressurized fluid; and said braking axle further comprises:

an axle connected at one end to said wheel;

said plurality of pumps being arranged in a circular pattern, coaxially with said axle;

means, coupled to an opposite end of said axle, for actuating said pumps;

an annular high-pressure chamber coaxial with said axle, said high pressure chamber being fed by said pumps;

a circular evacuation chamber surrounded by said high pressure chamber, said circular evacuation chamber having at least one aperture into said evacuation chamber; and a rotary choke mounted within said evacuation chamber for restricting flow of fluid through said aperture.

* * * * *